US011941174B1

(12) United States Patent
Ng et al.

(10) Patent No.: US 11,941,174 B1
(45) Date of Patent: Mar. 26, 2024

(54) FINGER PINCH DETECTION

(71) Applicant: Meta Platforms Technologies, LLC, Menlo Park, CA (US)

(72) Inventors: Shiu Sang Ng, Kirkland, WA (US); Yanjun Ma, Redmond, WA (US); Wolf Kienzle, Seattle, WA (US); Hrvoje Benko, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/158,311

(22) Filed: Jan. 23, 2023

Related U.S. Application Data

(63) Continuation of application No. 17/359,072, filed on Jun. 25, 2021, now Pat. No. 11,599,193, which is a continuation of application No. 16/418,369, filed on May 21, 2019, now Pat. No. 11,093,035.

(60) Provisional application No. 62/807,726, filed on Feb. 19, 2019.

(51) Int. Cl.
*G06F 3/041* (2006.01)
*G06F 3/01* (2006.01)

(52) U.S. Cl.
CPC ............. *G06F 3/014* (2013.01); *G06F 3/017* (2013.01)

(58) Field of Classification Search
CPC ...... G06F 3/014; G06F 3/017; G06K 7/10396
See application file for complete search history.

(56) References Cited

U.S. PATENT DOCUMENTS

| 11,093,035 | B1 | 8/2021 | Ng et al. | |
|---|---|---|---|---|
| 2014/0336669 | A1* | 11/2014 | Park | A61B 34/30 606/130 |
| 2015/0100910 | A1 | 4/2015 | Luo et al. | |
| 2016/0209875 | A1* | 7/2016 | Kim | A61B 5/01 |
| 2017/0097722 | A1* | 4/2017 | Ogawa | G06F 3/04186 |
| 2017/0185737 | A1* | 6/2017 | Kovacs | A61B 5/02416 |
| 2017/0212619 | A1 | 7/2017 | Sharma | |
| 2018/0256258 | A1* | 9/2018 | Nash | G06T 19/006 |
| 2018/0267653 | A1 | 9/2018 | Holman et al. | |
| 2018/0360379 | A1 | 12/2018 | Harrison et al. | |
| 2019/0339810 | A1* | 11/2019 | De Araujo | G06F 3/0445 |

(Continued)

OTHER PUBLICATIONS

Final Office Action dated Oct. 28, 2020 for U.S. Appl. No. 16/418,369, filed Jun. 25, 2021, 27 pages.

(Continued)

*Primary Examiner* — Abbas I Abdulselam
(74) *Attorney, Agent, or Firm* — Greenberg Traurig, LLP

(57) ABSTRACT

The disclosed system may include a support structure dimensioned for a user's hand. The system may also include transmitting electrodes coupled to a first finger portion of the support structure and may further include receiving electrodes coupled to a second, different finger portion of the support structure. The system may also include a controller that is coupled to the support structure and that is communicatively connected to the transmitting and receiving electrodes. The controller may also be configured to cause the transmitting electrodes to transmit a signal, detect at least some of the transmitted signal at the receiving electrodes and, based on the detected signal, determine that at least two fingers of the user's hand are touching each other. Various other methods, systems, and computer-readable media are also disclosed.

20 Claims, 12 Drawing Sheets

(56) References Cited

U.S. PATENT DOCUMENTS

2019/0346928 A1* 11/2019 Shahmohammadi ........................
                                                                                 H04B 13/005
2019/0388732 A1* 12/2019 Pichiliani ........... A63B 24/0075

OTHER PUBLICATIONS

Non-Final Office Action dated Jul. 2, 2020 for U.S. Appl. No. 16/418,369, filed Jun. 25, 2021, 19 pages.
Non-Final Office Action dated Feb. 8, 2021 for U.S. Appl. No. 16/418,369, filed Jun. 25, 2021, 29 pages.
Notice of Allowance dated May 12, 2021 for U.S. Appl. No. 16/418,369, filed Jun. 25, 2021, 21 pages.

* cited by examiner

FINGER PINCH DETECTION

CROSS REFERENCE TO RELATED APPLICATION

This application is a continuation of U.S. application Ser. No. 17/359,072, filed Jun. 25, 2021, which is a continuation of U.S. application Ser. No. 16/418,369, filed May 21, 2019 which claims the benefit of U.S. Provisional Application No. 62/807,726, filed Feb. 19, 2019, the disclosures of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
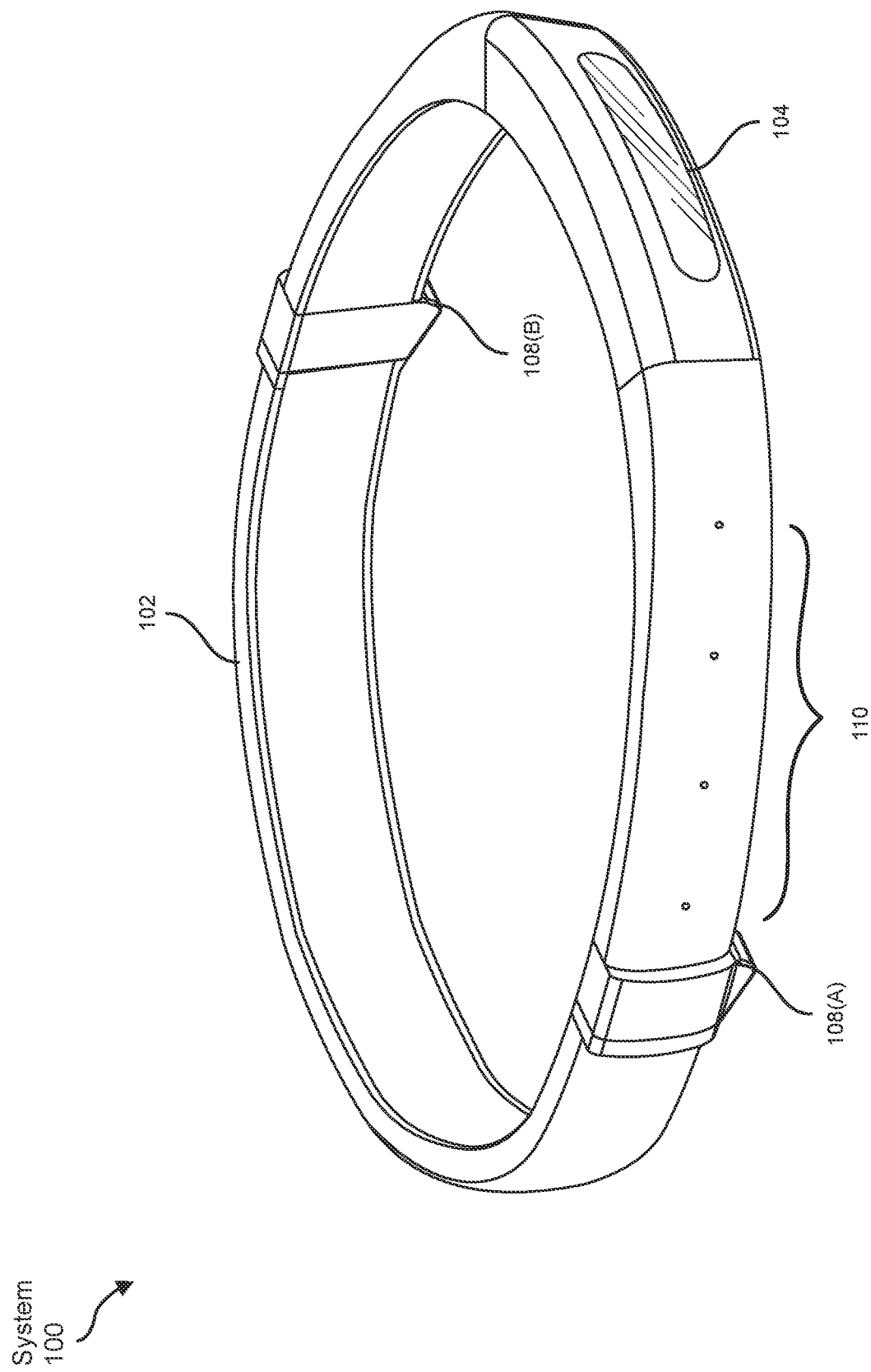
FIG. 1 is an illustration of an exemplary artificial-reality headband that may be used in connection with embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to a system for detecting when a user's fingers are touching or pinching each other. In the past, some traditional systems designed to detect finger touching have implemented cameras pointed at the user's fingers. Such cameras would capture video data and use object recognition to identify the user's hands and determine when the user's fingers are touching based on the recorded images. Such camera-based systems, however, typically lack refinement and accuracy, and cannot distinguish whether a user's fingers are actually touching versus when a user's fingers are nearly touching. Users of such systems may become increasingly frustrated as time goes on.

For instance, users can tell, based on their own biofeedback, when their fingers have touched. If the camera-based system fails to identify exactly when the user's fingers have touched or have released from a touch, the user will not want to use the system. Still further, other traditional systems have used microphones to detect the sounds caused by the user's fingers touching. Such systems may be designed to detect even minute finger taps or touches that make a detectable sound. These systems, however, are not able to accurately and reliably detect slow touches that make little to no noise, holds, or slow releases. Accordingly, many traditional systems for detecting touch are not viable for extended use.

As will be explained in greater detail below, embodiments of the present disclosure may include systems, methods, and apparatuses for detecting when a user's fingers are touching. These systems may also determine how long those user's fingers are touching and when the user's fingers are released. In one embodiment, a support structure is provided that may be dimensioned for a user's hand. The system may include transmitting electrodes coupled to a first finger portion of the support structure and may further include receiving electrodes coupled to a second, different finger portion of the support structure. The system may also include a controller that is coupled to the support structure and that is communicatively connected to the transmitting and receiving electrodes. The controller may be configured to cause the transmitting electrodes to transmit a signal, detect at least some of the transmitted signal at the receiving electrodes and, based on the detected signal, determine that at least two fingers of the user's hand are touching each other. In at least some embodiments, the transmitting and receiving electrodes may be dynamically reconfigurable, such that transmitting electrodes may become receiving electrodes and receiving electrodes may become transmitting electrodes. These concepts will be explained further below with regard to FIGS. 7-11. FIGS. 1-6 discussed immediately below provide details regarding artificial reality systems and devices with which the embodiments of FIGS. 7-11 may be used.

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 100 in FIG. 1. Other artificial-reality systems may include an NED that also provides visibility into the real world (e.g., augmented-reality system 200 in FIG. 2) or that visually immerses a user in an artificial reality (e.g., virtual-reality system 300 in FIG. 3). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 1, augmented-reality system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. Augmented-reality system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, augmented-reality system 100 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 100 may not include an NED, augmented-reality system 100 may include other types of screens or visual feedback devices (e.g., a display screen integrated into a side of frame 102).

Figure 2:
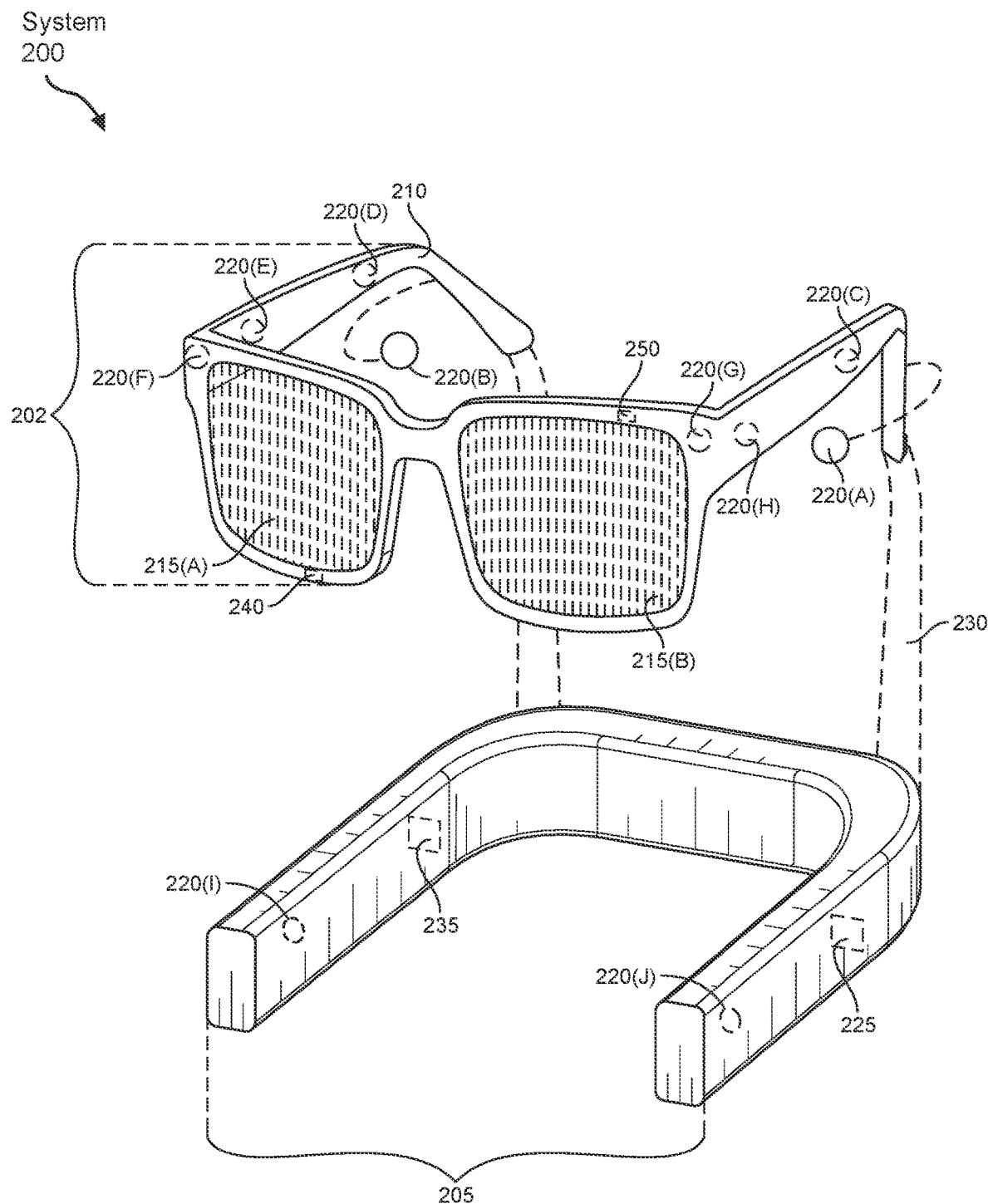
FIG. 2 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 2, augmented-reality system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While augmented-reality system 200 includes two displays, embodiments of this disclosure may be implemented in augmented-reality systems with a single NED or more than two NEDs.

In some embodiments, augmented-reality system 200 may include one or more sensors, such as sensor 240. Sensor 240 may generate measurement signals in response to motion of augmented-reality system 200 and may be located on substantially any portion of frame 210. Sensor 240 may represent a position sensor, an inertial measurement unit (IMU), a depth camera assembly, or any combination thereof. In some embodiments, augmented-reality system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof. Augmented-reality system 200 may also include a microphone array with a plurality of acoustic transducers 220(A)-220(J), referred to collectively as acoustic transducers 220. Acoustic transducers 220 may be transducers that detect air pressure variations induced by sound waves. Each acoustic transducer 220 may be configured to detect sound and convert the detected sound into an electronic format (e.g., an analog or digital format). The microphone array in FIG. 2 may include, for example, ten acoustic transducers: 220(A) and 220(B), which may be designed to be placed inside a corresponding ear of the user, acoustic transducers 220(C), 220(D), 220(E), 220(F), 220 (G), and 220(H), which may be positioned at various locations on frame 210, and/or acoustic transducers 220(I) and 220(J), which may be positioned on a corresponding neckband 205.

In some embodiments, one or more of acoustic transducers 220(A)-(F) may be used as output transducers (e.g., speakers). For example, acoustic transducers 220(A) and/or 220(B) may be earbuds or any other suitable type of headphone or speaker.

The configuration of acoustic transducers 220 of the microphone array may vary. While augmented-reality system 200 is shown in FIG. 2 as having ten acoustic transducers 220, the number of acoustic transducers 220 may be greater or less than ten. In some embodiments, using higher numbers of acoustic transducers 220 may increase the amount of audio information collected and/or the sensitivity and accuracy of the audio information. In contrast, using a lower number of acoustic transducers 220 may decrease the computing power required by an associated controller 250 to process the collected audio information. In addition, the position of each acoustic transducer 220 of the microphone array may vary. For example, the position of an acoustic transducer 220 may include a defined position on the user, a defined coordinate on frame 210, an orientation associated with each acoustic transducer 220, or some combination thereof.

Acoustic transducers 220(A) and 220(B) may be positioned on different parts of the user's ear, such as behind the pinna or within the auricle or fossa. Or, there may be additional acoustic transducers 220 on or surrounding the ear in addition to acoustic transducers 220 inside the ear canal. Having an acoustic transducer 220 positioned next to an ear canal of a user may enable the microphone array to collect information on how sounds arrive at the ear canal. By positioning at least two of acoustic transducers 220 on either side of a user's head (e.g., as binaural microphones), augmented-reality device 200 may simulate binaural hearing and capture a 3D stereo sound field around about a user's head. In some embodiments, acoustic transducers 220(A) and 220(B) may be connected to augmented-reality system 200 via a wired connection 230, and in other embodiments, acoustic transducers 220(A) and 220(B) may be connected to augmented-reality system 200 via a wireless connection (e.g., a Bluetooth connection). In still other embodiments, acoustic transducers 220(A) and 220(B) may not be used at all in conjunction with augmented-reality system 200.

Acoustic transducers 220 on frame 210 may be positioned along the length of the temples, across the bridge, above or below display devices 215(A) and 215(B), or some combination thereof. Acoustic transducers 220 may be oriented such that the microphone array is able to detect sounds in a wide range of directions surrounding the user wearing the augmented-reality system 200. In some embodiments, an optimization process may be performed during manufacturing of augmented-reality system 200 to determine relative positioning of each acoustic transducer 220 in the microphone array.

In some examples, augmented-reality system 200 may include or be connected to an external device (e.g., a paired device), such as neckband 205. Neckband 205 generally represents any type or form of paired device. Thus, the following discussion of neckband 205 may also apply to various other paired devices, such as charging cases, smart watches, smart phones, wrist bands, other wearable devices, hand-held controllers, tablet computers, laptop computers and other external compute devices, etc.

As shown, neckband 205 may be coupled to eyewear device 202 via one or more connectors. The connectors may be wired or wireless and may include electrical and/or non-electrical (e.g., structural) components. In some cases, eyewear device 202 and neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of eyewear device 202 and neckband 205 may be located on one or more additional peripheral devices paired with eyewear device 202, neckband 205, or some combination thereof.

Pairing external devices, such as neckband 205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 205 may be communicatively coupled with eyewear device 202 and/or to other devices. These other devices may provide certain functions (e.g., tracking, localizing, depth mapping, processing, storage, etc.) to augmented-reality system 200. In the embodiment of FIG. 2, neckband 205 may include two acoustic transducers (e.g., 220(I) and 220(J)) that are part of the microphone array (or potentially form their own microphone subarray). Neckband 205 may also include a controller 225 and a power source 235.

Acoustic transducers 220(I) and 220(J) of neckband 205 may be configured to detect sound and convert the detected sound into an electronic format (analog or digital). In the embodiment of FIG. 2, acoustic transducers 220(I) and 220(J) may be positioned on neckband 205, thereby increasing the distance between the neckband acoustic transducers 220(I) and 220(J) and other acoustic transducers 220 positioned on eyewear device 202. In some cases, increasing the distance between acoustic transducers 220 of the microphone array may improve the accuracy of beamforming performed via the microphone array. For example, if a sound is detected by acoustic transducers 220(C) and 220(D) and the distance between acoustic transducers 220(C) and 220(D) is greater than, e.g., the distance between acoustic transducers 220(D) and 220(E), the determined source location of the detected sound may be more accurate than if the sound had been detected by acoustic transducers 220(D) and 220(E).

Controller 225 of neckband 205 may process information generated by the sensors on neckband 205 and/or augmented-reality system 200. For example, controller 225 may process information from the microphone array that describes sounds detected by the microphone array. For each detected sound, controller 225 may perform a direction-of-arrival (DOA) estimation to estimate a direction from which the detected sound arrived at the microphone array. As the microphone array detects sounds, controller 225 may populate an audio data set with the information. In embodiments in which augmented-reality system 200 includes an inertial measurement unit, controller 225 may compute all inertial and spatial calculations from the IMU located on eyewear device 202. A connector may convey information between augmented-reality system 200 and neckband 205 and between augmented-reality system 200 and controller 225. The information may be in the form of optical data, electrical data, wireless data, or any other transmittable data form. Moving the processing of information generated by augmented-reality system 200 to neckband 205 may reduce weight and heat in eyewear device 202, making it more comfortable to the user.

Power source 235 in neckband 205 may provide power to eyewear device 202 and/or to neckband 205. Power source 235 may include, without limitation, lithium ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 300 in FIG. 3, that mostly or completely covers a user's field of view. Virtual-reality system 300 may include a front rigid body 302 and a band 304 shaped to fit around a user's head. Virtual-reality system 300 may also include output audio transducers 306(A) and 306(B). Furthermore, while not shown in FIG. 3, front rigid body 302 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 200 and/or virtual-reality system 300 may include one or more liquid crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in augmented-reality system 200 and/or virtual-reality system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, augmented-reality system 100, augmented-reality system 200, and/or virtual-reality system 300 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

Figure 3:
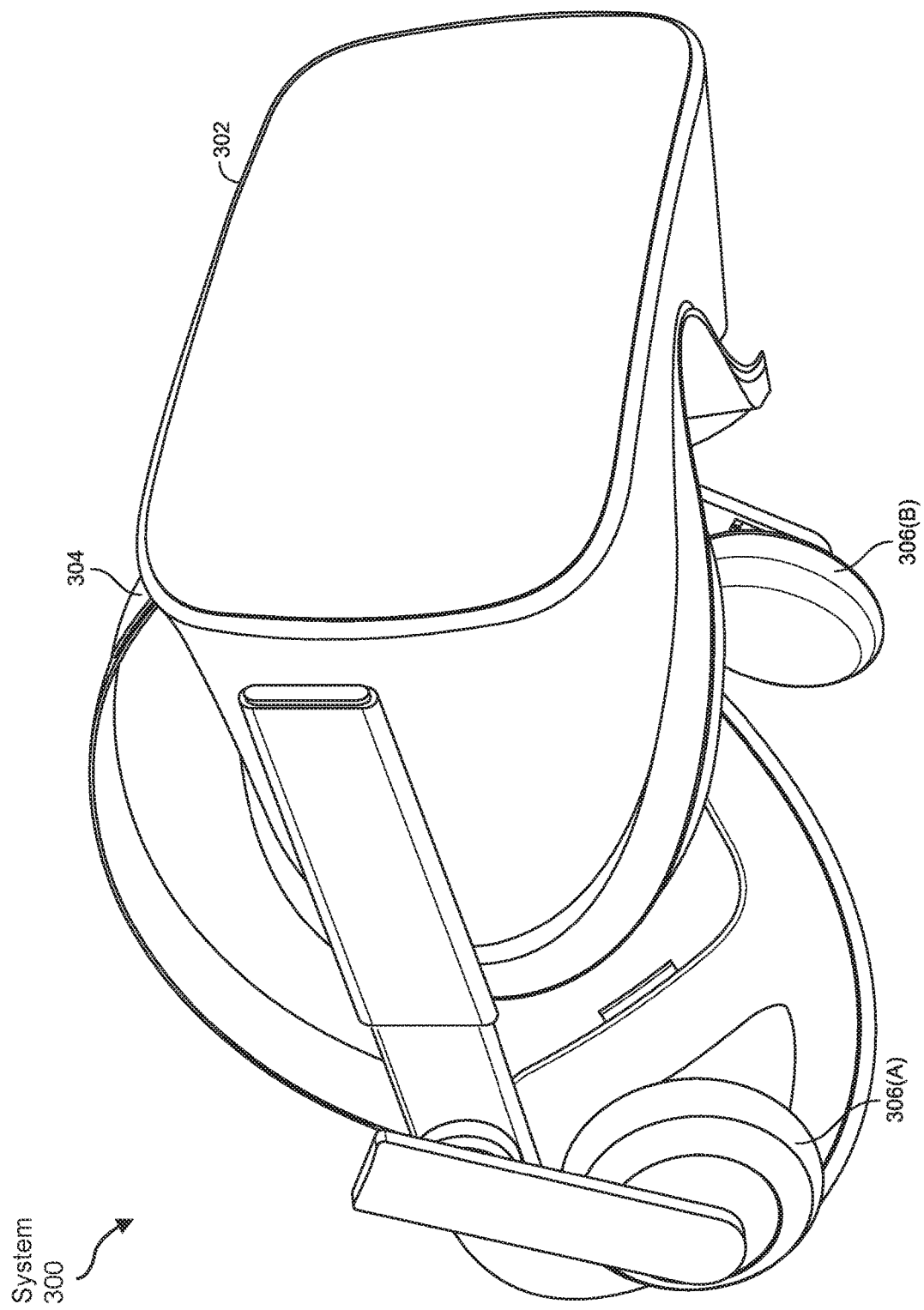
FIG. 3 is an illustration of an exemplary virtual-reality headset that may be used in connection with embodiments of this disclosure.

While not shown in FIGS. 1-3, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, artificial-reality systems 100, 200, and 300 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 4:
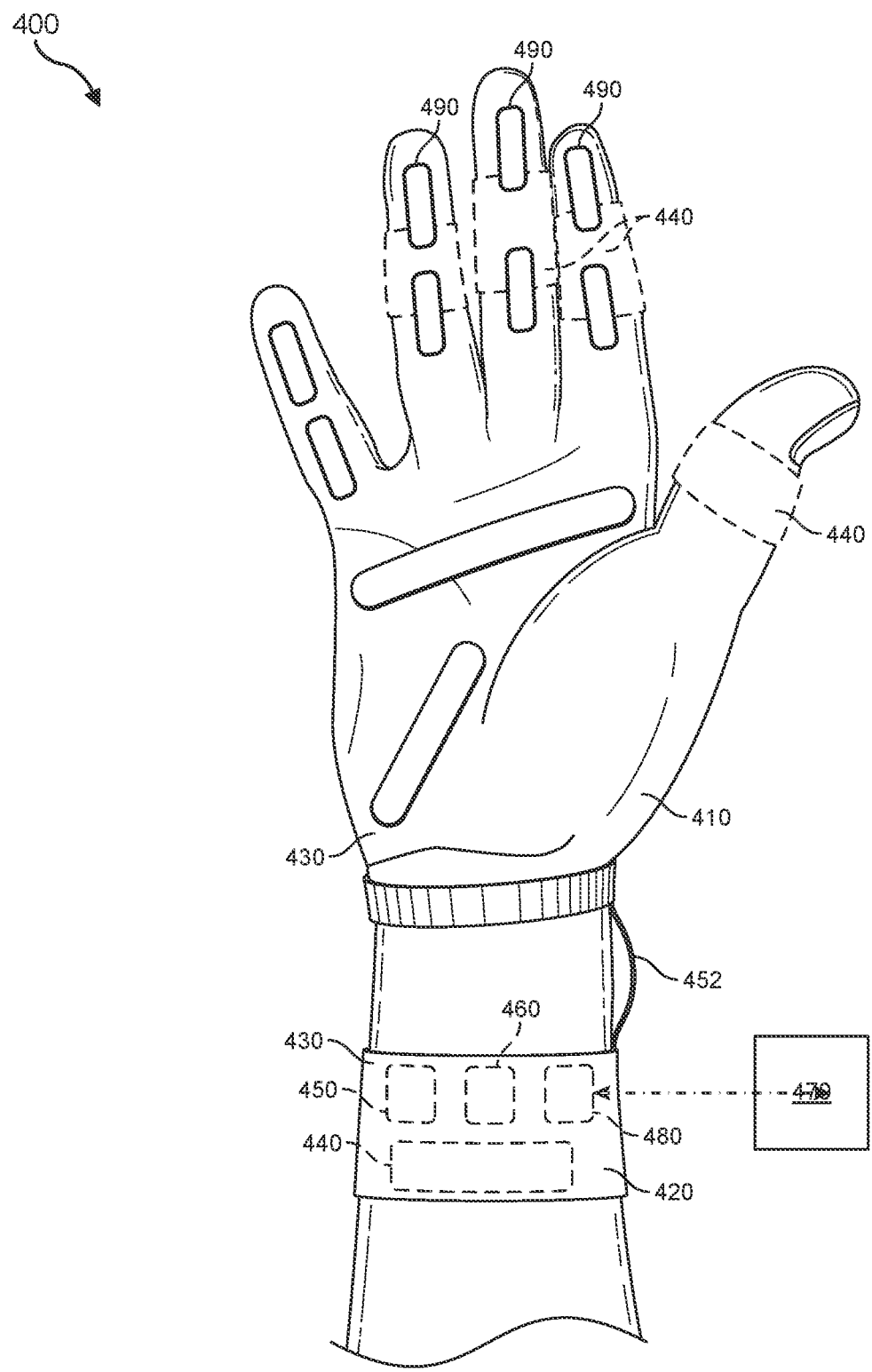
FIG. 4 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 4 illustrates a vibrotactile system 400 in the form of a wearable glove (haptic device 410) and wristband (haptic device 420). Haptic device 410 and haptic device 420 are shown as examples of wearable devices that include a flexible, wearable textile material 430 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 440 may be positioned at least partially within one or more corresponding pockets formed in textile material 430 of vibrotactile system 400. Vibrotactile devices 440 may be positioned in locations to provide a vibrating sensation (e.g., haptic feedback) to a user of vibrotactile system 400. For example, vibrotactile devices 440 may be positioned to be against the user's finger(s), thumb, or wrist, as shown in FIG. 4. Vibrotactile devices 440 may, in some examples, be sufficiently flexible to conform to or bend with the user's corresponding body part(s).

A power source 450 (e.g., a battery) for applying a voltage to the vibrotactile devices 440 for activation thereof may be electrically coupled to vibrotactile devices 440, such as via conductive wiring 452. In some examples, each of vibrotactile devices 440 may be independently electrically coupled to power source 450 for individual activation. In some embodiments, a processor 460 may be operatively coupled to power source 450 and configured (e.g., programmed) to control activation of vibrotactile devices 440.

Vibrotactile system 400 may be implemented in a variety of ways. In some examples, vibrotactile system 400 may be a standalone system with integral subsystems and components for operation independent of other devices and systems. As another example, vibrotactile system 400 may be configured for interaction with another device or system 470. For example, vibrotactile system 400 may, in some examples, include a communications interface 480 for receiving and/or sending signals to the other device or system 470. The other device or system 470 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 480 may enable communications between vibrotactile system 400 and the other device or system 470 via a wireless (e.g., Wi-Fi, Bluetooth, cellular, radio, etc.) link or a wired link. If present, communications interface 480 may be in communication with processor 460, such as to provide a signal to processor 460 to activate or deactivate one or more of the vibrotactile devices 440.

Vibrotactile system 400 may optionally include other subsystems and components, such as touch-sensitive pads 490, pressure sensors, motion sensors, position sensors, lighting elements, and/or user interface elements (e.g., an on/off button, a vibration control element, etc.). During use, vibrotactile devices 440 may be configured to be activated for a variety of different reasons, such as in response to the user's interaction with user interface elements, a signal from the motion or position sensors, a signal from the touch-sensitive pads 490, a signal from the pressure sensors, a signal from the other device or system 470, etc.

Although power source 450, processor 460, and communications interface 480 are illustrated in FIG. 4 as being positioned in haptic device 420, the present disclosure is not so limited. For example, one or more of power source 450, processor 460, or communications interface 480 may be positioned within haptic device 410 or within another wearable textile.

Figure 5:
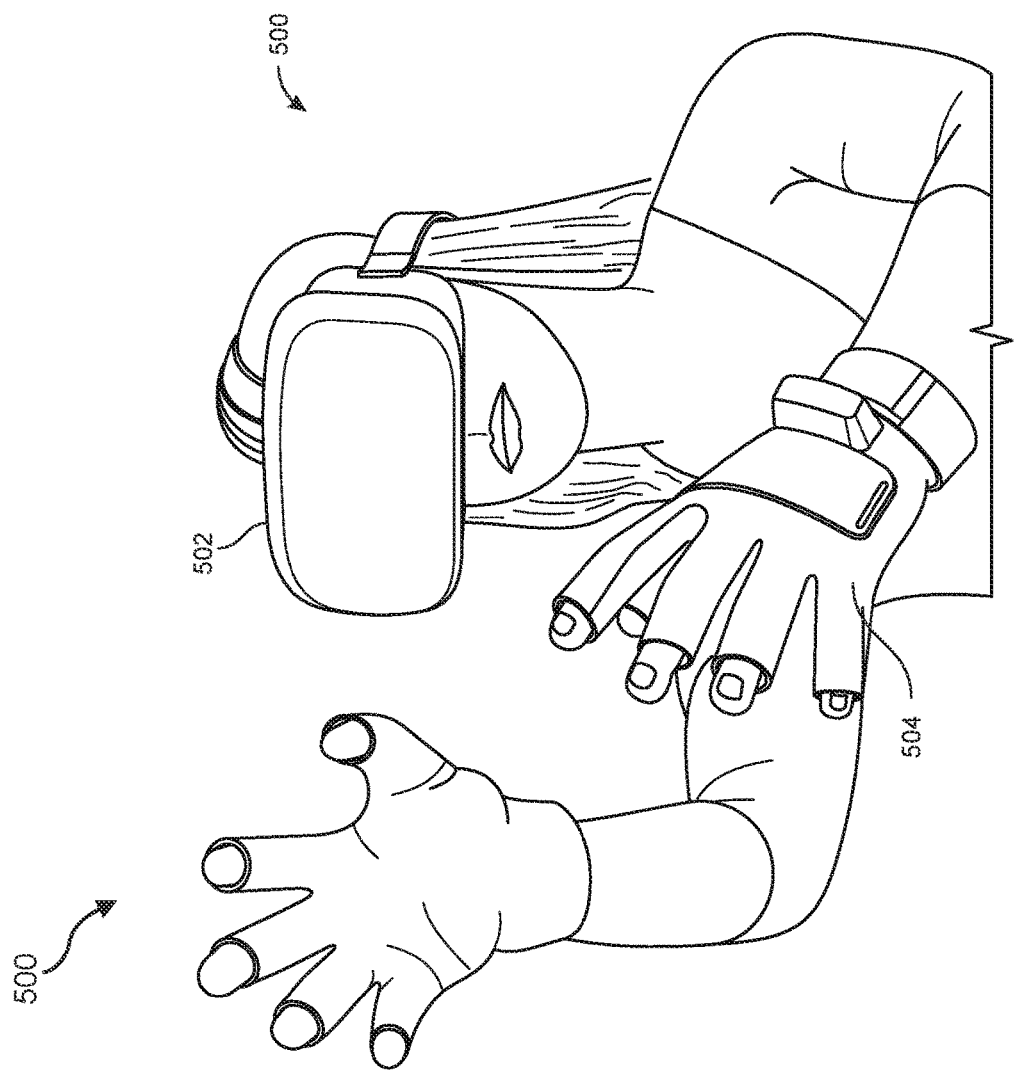
FIG. 5 is an illustration of an exemplary virtual-reality environment according to embodiments of this disclosure.

Haptic wearables, such as those shown in and described in connection with FIG. 4, may be implemented in a variety of types of artificial-reality systems and environments. FIG. 5 shows an example artificial-reality environment 500 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 502 generally represents any type or form of virtual-reality system, such as virtual-reality system 300 in FIG. 3. Haptic device 504 generally represents any type or form of wearable device, worn by a use of an artificial-reality system, that provides haptic feedback to the user to give the user the perception that he or she is physically engaging with a virtual object. In some embodiments, haptic device 504 may provide haptic feedback by applying vibration, motion, and/or force to the user. For example, haptic device 504 may limit or augment a user's movement. To give a specific example, haptic device 504 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 504 to send action requests to a console. Examples of action requests include, without limitation, requests to start an application and/or end the application and/or requests to perform a particular action within the application.

Figure 6:
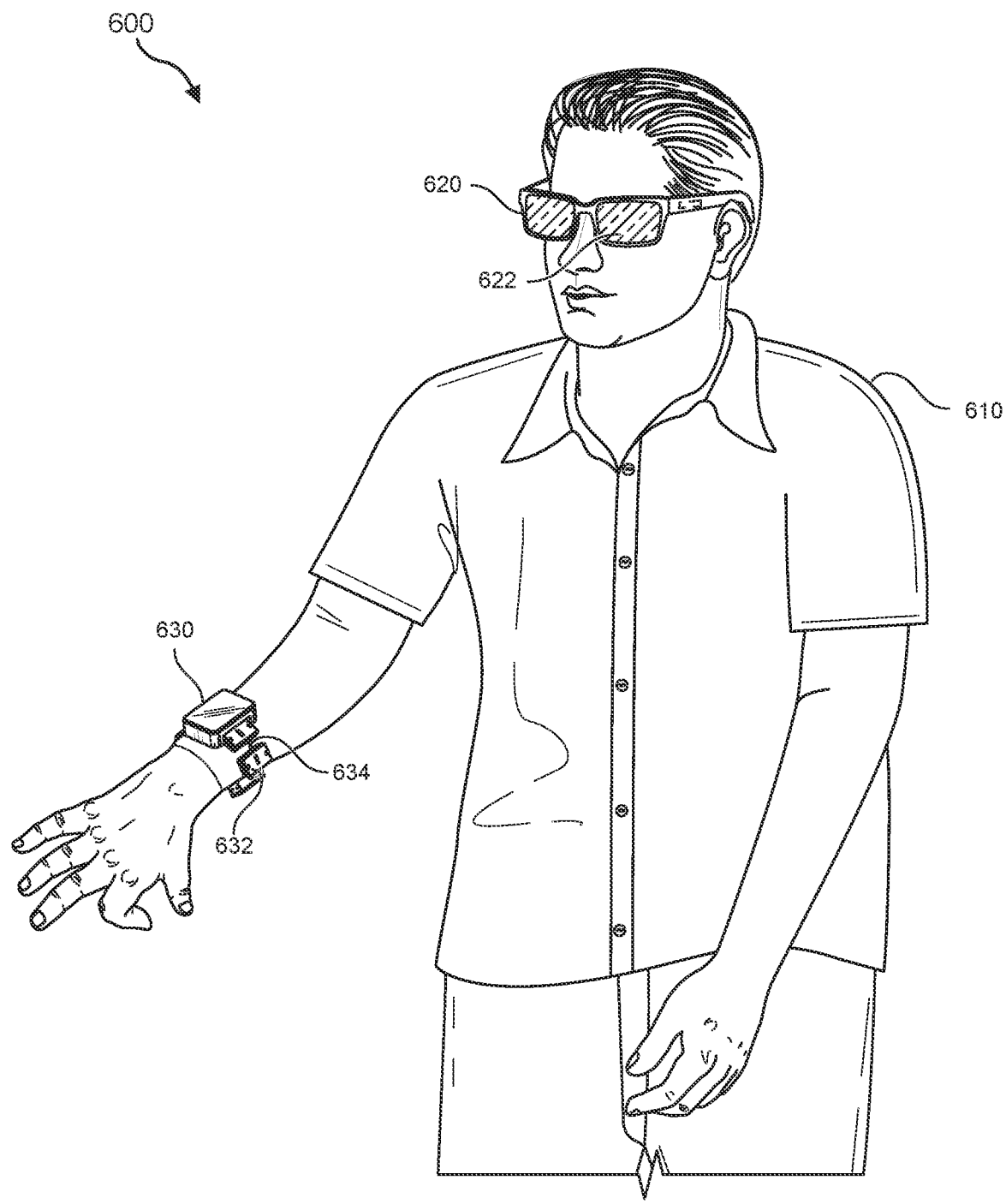
FIG. 6 is an illustration of an exemplary augmented-reality environment according to embodiments of this disclosure.

While haptic interfaces may be used with virtual-reality systems, as shown in FIG. 5, haptic interfaces may also be used with augmented-reality systems, as shown in FIG. 6. FIG. 6 is a perspective view a user 610 interacting with an augmented-reality system 600. In this example, user 610 may wear a pair of augmented-reality glasses 620 that have one or more displays 622 and that are paired with a haptic device 630. Haptic device 630 may be a wristband that includes a plurality of band elements 632 and a tensioning mechanism 634 that connects band elements 632 to one another.

One or more of band elements 632 may include any type or form of actuator suitable for providing haptic feedback. For example, one or more of band elements 632 may be configured to provide one or more of various types of cutaneous feedback, including vibration, force, traction, texture, and/or temperature. To provide such feedback, band elements 632 may include one or more of various types of actuators. In one example, each of band elements 632 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 410, 420, 504, and 630 may include any suitable number and/or type of haptic transducer, sensor, and/or feedback mechanism. For example, haptic devices 410, 420, 504, and 630 may include one or more mechanical transducers, piezoelectric transducers, and/or fluidic transducers. Haptic devices 410, 420, 504, and 630 may also include various combinations of different types and forms of transducers that work together or independently to enhance a user's artificial-reality experience. In one example, each of band elements 632 of haptic device 630 may include a vibrotactor (e.g., a vibrotactile actuator) configured to vibrate in unison or independently to provide one or more of various types of haptic sensations to a user.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 7:
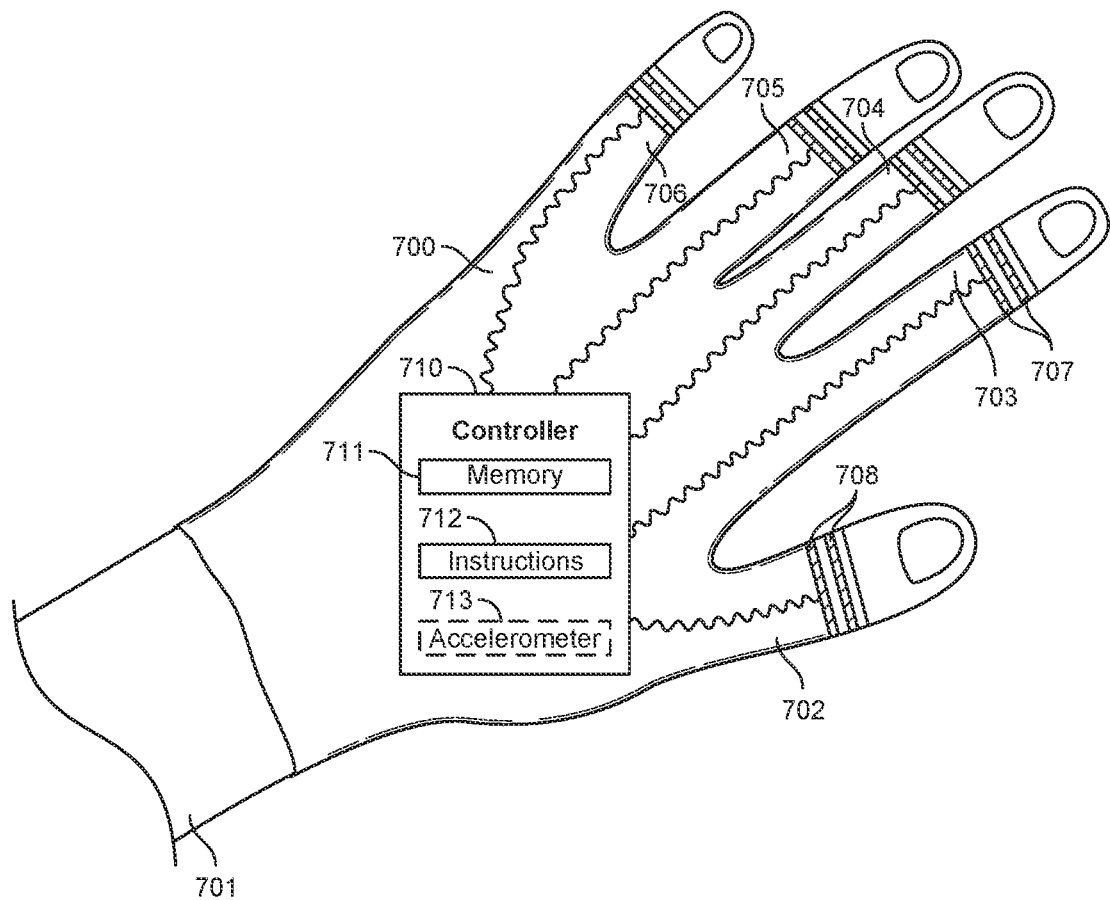
FIG. 7 is an illustration of an exemplary apparatus configured to detect when a user's fingers are touching.

The following will provide, with reference to FIGS. 7-11, detailed descriptions of systems, methods, and apparatuses for detecting when fingers are touching or pinching each other. FIG. 7, for example, illustrates an embodiment of a system for detecting when a user's fingers are touching. The system may include a support structure dimensioned for a user's hand. The support structure may be a glove or partial glove (e.g., 700) that fits over a user's hand 701. The glove 700 may be made of a variety of different materials including cloth, leather, mesh fabrics, plastic, or other materials or combinations of materials. In some cases, the glove 700 may be designed to be stretchable so as to comfortably fit over the contours of the user's hand 701. The glove may be a partial glove such as a "biker's glove" that is cut off midway up the user's fingers. This may allow the user's fingertips to be free of the glove and able to feel and hold objects without any encumbrances.

The glove 700 may include various transmitting electrodes coupled to different finger portions of the glove. For example, transmitting electrodes 707 may be coupled to the portion of the glove 703 that extends over the base of the user's pointer finger. Other transmitting (or receiving) electrodes may be positioned on middle finger portion 704, on ring finger portion 705, and on pinky finger portion 706. Receiving electrodes 708 may be coupled to the thumb portion of the glove 702 or to other finger portions. Here it should be noted that while some electrodes may be referred to as "transmitting electrodes" or "receiving electrodes," any of the electrodes described herein may be configured to operate in a receive mode or a transmit mode. In some cases, this mode may be changed using computing software, hardware, or firmware. The operating mode may be set and left in that mode or may be changed dynamically. For example, electrodes 707 may be set and operated as transmit electrodes unless otherwise changed. In other cases, electrodes 707 may be changed at specified intervals from a transmit electrode to a receive electrode. Thus, any references to a "transmitting electrode" or "receiving electrode" herein may refer to the current operating mode of that electrode which may be subject to change depending on the embodiment.

A controller (e.g., 710) may be configured to control the operating state of the various electrodes (e.g., 707, 708, or other electrodes). The controller 710 may be any type of processor or specific-purpose computing system including an application-specific integrated circuit (ASIC), field-programmable gate array (FPGA), electronically-erasable programmable read-only memory (EEPROM), or similar specific-purpose integrated circuit. The controller may have its own memory 711 and/or data store with computer-executable instructions 712 that are carried out by the controller 710. The controller may also be coupled to a battery or other power source (not shown). The controller 710 may be embedded in the glove 700 or may be coupled to one of the surfaces on the glove. Additionally, the controller 710 may be communicatively connected to the various transmitting and receiving electrodes in finger portions 702-706. Here it will be recognized that the electrodes may be attached to substantially any portion of glove 700 and that the illustrated attachment sites are only examples of attachment sites. The electrodes may be ring electrodes configured to fit around a user's fingers, or any other type of electrodes.

The controller 710 may be configured to cause the various transmitting electrodes to transmit a signal. This signal may be an electrical signal that travels through a user's fingers. The electrical signal may, for example, travel through a user's pointer finger to the user's thumb when the two are touching. The controller 710 may be configured to detect minute changes in the transmitted signal at various receiving electrodes (e.g., 708). For example, when the user's fingers are not touching, impedance between the transmitting and receiving electrodes may be relatively high and, as such, any detected signal between the fingers may be correspondingly weak. However, when the user touches two or more of their fingertips together, the electrical loop between those fingers may be closed, and the amount of detected signal may raise up significantly. Based on this detected signal at the receiving electrodes, the controller 710 may determine that at least two fingers of the user's hand are touching each other. In other embodiments, which will be described further below, the controller 710 may be configured to determine not only that two fingers are touching, but may determine which two fingers are touching, which three (or more) fingers are touching, when certain fingers have stopped touching, how long a given finger touch lasted, when fingers are swiping against each other, as well as other determinations. These embodiments will be described further below in conjunction with method 800 of FIG. 8.

Figure 8:
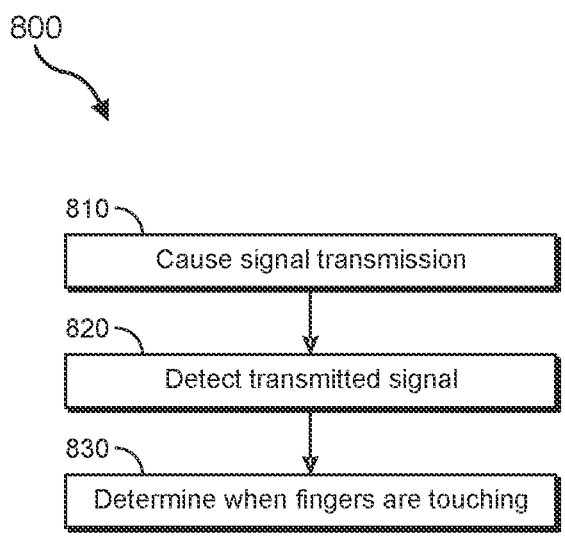
FIG. 8 is a flow diagram of an exemplary method for determining when a user's fingers are touching.

FIG. 8 is a flow diagram of an exemplary computer-implemented method 800 for determining when a user's fingers are touching. The steps shown in FIG. 8 may be performed by any suitable computer-executable code and/or computing system, including the system(s) illustrated in FIG. 7. In one example, each of the steps shown in FIG. 8 may represent an algorithm whose structure includes and/or is represented by multiple sub-steps, examples of which will be provided in greater detail below.

As illustrated in FIG. 8, at step 810, a controller may cause one or more transmitting electrodes to transmit a signal. For example, controller 710 of FIG. 7 may cause electrodes 707 to transmit a signal. The transmitted signal may travel through (i.e., may be conducted by) the user's fingers. The controller 710 may be coupled to a support structure such as glove 700, which may be sized to fit on a user's hand. The controller 710 may be communicatively connected to one or more transmitting electrodes (e.g., 707) and may be further connected to one or more receiving electrodes (e.g., 708). In some cases, the electrodes may be used in pairs to differentially transmit and detect signals. Such differential transmission and reception may provide increased accuracy and granularity in detecting signal change. Alternatively, the electrodes may be used singly with a single transmitting electrode transmitting a signal to a single receiving electrode. Thus, although shown as pairs of electrodes in FIG. 7, it will be recognized that single electrodes or pairs of electrodes (or greater numbers of electrodes) may be used on any portion of any finger.

The controller 710 may be connected to the electrodes via wires or other means of conducting a signal. The receiving electrodes 708 may receive at least some of the signal transmitted by the transmitting electrodes 707. The controller 710 may be configured to detect, at step 820, at least some of the transmitted signal at the receiving electrodes 708. Then, based on the detected signal, the controller 710 may determine, at step 830, that at least two fingers of the user's hand have begun touching each other and/or are still touching each other. If the detected signal begins to drop or drops after the initial touching, the controller 710 may determine that the fingers are no longer touching each other. In this manner, by detecting electrical signals transmitted by the transmitting electrodes and carried through the user's skin and flesh, the controller 710 may determine when, and for how long, a user's fingers have been touching. By examining the received frequency, the controller 710 may determine which fingers are touching.

Although the principles described herein may work for other parts of the body, these principles will generally be described with relation to the human hand and fingers. A support structure, such as a glove or partial glove may be used to house the electrodes and/or the controller 710. In some cases, the electrodes 707/708, controller 710, and other electronics may be embedded within the glove 700, while in other cases, the controller and electrodes may be coupled to an outer or inner surface of the glove. In some embodiments, the thumb portion 702 may be equipped with receiving electrodes while the other fingers (including pointer finger portion 703) are equipped with transmitting electrodes. The reverse may also be true where the thumb electrodes operate in transmitting mode while the other four fingers' electrodes operate in receiving mode. Still further, transmitting and receiving electrodes may be mixed and matched between fingers and thumb in different scenarios, such that some fingers have transmitting electrodes and some fingers have receiving electrodes. And, in other cases, the transmit or receive role of an electrode may be changed continually (e.g., every second or every 10 seconds or every millisecond, etc.). Thus, on any given glove, many different combinations of transmitting and receiving electrodes are possible.

As shown in FIG. 7, for example, a user may be wearing a glove 700. The glove 700 may be a traditional glove, a half-glove where the user's fingertips are exposed, or a haptic glove configured to provide haptic feedback to the user. In cases where the glove is a haptic glove, the haptic feedback (e.g., vibrations, buzzing, or other tactile sensations) may be provided by transducers. In some cases, the glove 700 may include separate transducers and electrodes, while in other cases, electrodes 707 and 708 may function as both electrodes and transducers. In such cases, the electrodes 707 and 708 may be designed to vibrate upon receiving an initiation signal from the controller 710. The electrodes may also be designed to determine when the user's fingers are touching by measuring signal strength in electrical signals transferred between the electrodes (e.g., between electrodes 707 and 708).

The electrodes may be relatively small in relation to the user's hand 701 and in relation to the glove 700. As such, the electrodes 707/708 (as well as other electrodes on other fingers) may remain substantially flush with the surface of the glove 700. The electrodes 707 and 708 may be embedded in the glove 700 and may be positioned substantially anywhere on the glove. At least in some embodiments, the electrodes may be driven at a specified impedance. For example, the transmitting electrodes (TX) may be driven at a relatively low impedance and the receiving electrodes (RX) may form a high impedance input to a sensing circuit (e.g., controller 710). As a result, in at least some embodiments, any parasitic capacitance between TX electrodes may be neglected. In some embodiments, the TX and RX electrodes may be spaced apart from each other to reduce parasitic capacitance. For instance, the electrodes 707 and 708 on glove 700 may be spaced a minimum of five millimeters apart to reduce parasitic capacitance between TX and RX electrodes.

In some cases, as shown in FIG. 7, the controller 710 to which the electrodes 707 and 708 are connected may be placed on the back of the user's hand. By placing the controller on the back of the hand and by routing any conductors to the controller over the backs of the fingers, the TX and RX electrodes may be optimally spaced for maximum transfer of signal and minimal interference or losses due to parasitic capacitance. As such, portions of a signal transmitted from a TX electrode (e.g., 707) may travel through the user's body to an RX electrode (e.g., 708) in a reliable and detectable manner. In some cases, a reference electrode may be used to account for any losses or fluctuations to the signal caused by the user's body. The reference electrode may be place in a location on the glove 100 where it is unlikely that another electrode will touch it. In some embodiments, the reference electrode may be a TX electrode (e.g., 707) and in other cases, the reference electrode may be an RX electrode (e.g., 708). In some cases, an active driven shield may be placed over each TX/RX electrode pairs. Such an active driven shield may partially or completely eliminate the influence of parasitic capacitance. This may allow additional freedom in the location and implementation of TX/RX electrodes on the glove 700.

Figure 9A:
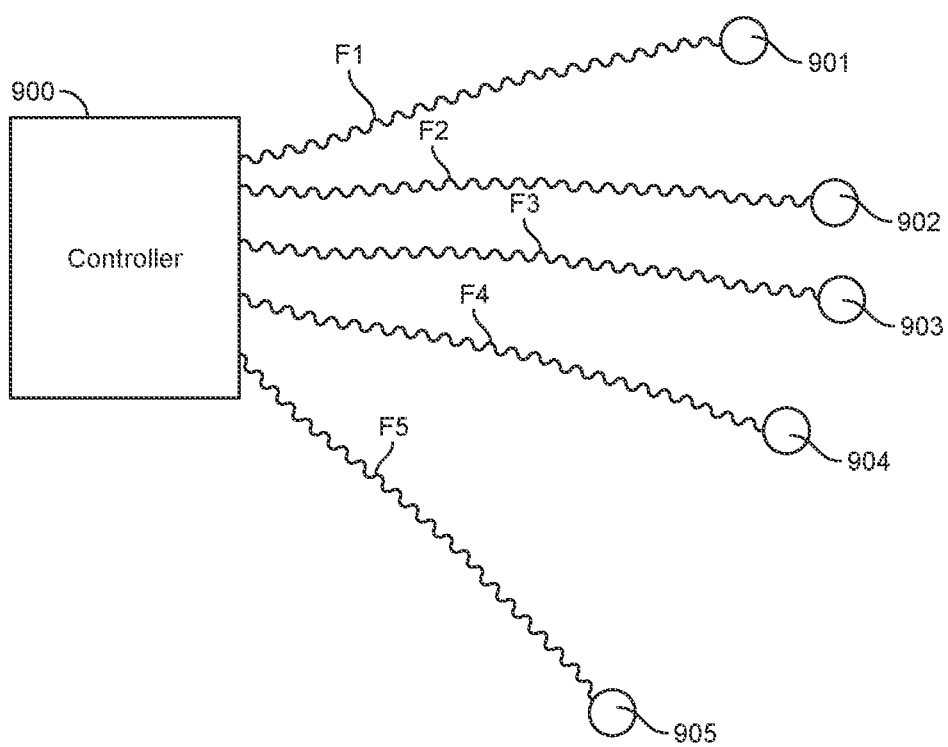
FIG. 9A is an illustration of an embodiment in which multiple frequencies are used to determine which fingers are touching.

These TX and RX electrodes 707/708 may be driven as pairs or may be driven individually. For instance, TX electrodes 707 may be differential electrodes driven together at one frequency. Receiver electrodes 708 may also be differential electrodes and may be driven together at a different frequency. Pairs of electrodes on other fingers may similarly be driven together, but at different frequencies than those used for electrodes 707 and 708. In some cases, the electrodes on each finger may be operated at different frequencies. For example, as shown in FIG. 9A, the electrodes 901-905 may transmit signals in the KHz or MHz range. Electrode 901 may operate at, for instance, 5.25 MHz (f1), electrode 902 may operate at 5.75 MHz (f2), electrode 903 may operate at 6.25 MHz (f3), and so on with electrodes 904 and 905 operating at different frequencies f4 and f5. Any receiving electrodes (e.g., 905) may receive input signals from these electrodes and may determine which frequency was used to transmit each signal.

In one embodiment, RX electrode 905 may receive an input signal at 5.25 MHz and may thus determine that the signal was received from TX electrode 901 since TX electrode 901 may be the only TX electrode on the glove 700 that is transmitting at frequency f1. Similarly, RX electrode 905 may receive an input signal at 5.75 MHz and may thus determine that the signal was received from TX electrode 902. Because each TX electrode may be configured to have its own transmitting frequency, the RX electrodes may be able to determine which finger contacted the user's thumb. In cases where the thumb electrode 905 is acting as a transmitter, and other finger electrodes are acting as receiving electrodes, the controller 900 may determine which other fingers are touching each other by detecting which frequency the detected signal has.

The controller 900 may identify a finger contact between the user's fingers when the controller detects a sufficient signal change between TX and RX electrodes. As noted above, portions of a signal may couple from a TX electrode, through the user's body, to an RX electrode. Thus, in FIG. 9A, portions of a signal from TX electrodes 901-904 may travel through the user's finger to RX electrode 905. The controller 900 may determine, over time, when this detected signal gets stronger or weaker. In some embodiments, the controller 900 may establish thresholds that indicate when a user's fingers are touching. Thus, if a user's fingers come closer and closer to each other and eventually touch, the controller may register a ramping up of signal amplitude between the TX and RX electrodes. Once the amplitude reaches the minimum threshold level indicating a touch, the controller 900 may determine that the user's fingers are touching. Then, based on the frequency of the signal, the controller 900 may determine which of the user's fingers were touching each other.

In cases where the user is wearing a haptic glove, the controller may provide haptic feedback as soon as a touch is registered. For example, a haptic glove may provide haptic feedback directly through the glove (e.g., 700 of FIG. 7) or may send an indication to a headset or other artificial reality device indicating that a touch has occurred, and that haptic and/or visual feedback may be provided to the user. Knowing the frequency of the TX nodes may allow the controller to identify which TX and RX nodes were linked through the user's skin and flesh, providing even more contextual information to the artificial reality device. As such, a virtual reality device that was depicting a representation of the user's hands may generate a display showing which fingers were touching based on the context information. Still further, if multiple fingers were touching each other or touching the thumb, the system may detect these multi-touches and may similarly generate a representation of these touches or may provide haptic feedback indicating which fingers were touching.

Figure 9B:
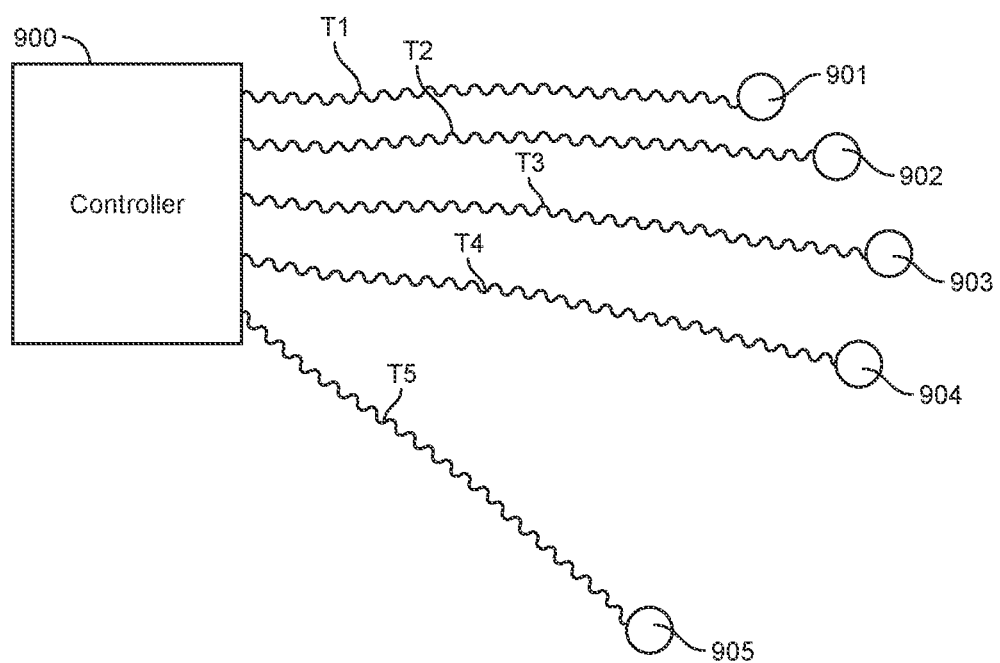
FIG. 9B is an illustration of an embodiment in which time-multiplexing is used to determine which fingers are touching.

In some embodiments, as shown in FIG. 9B, each of the transmitting electrodes may transmit a time-multiplexed signal using a shared frequency. Thus, in contrast to scenarios where each of the electrodes 901-905 uses a different frequency, in FIG. 9B, each of the electrodes may use the same, shared frequency. However, despite using the same frequency, the signals transmitted by the electrodes may be time-multiplexed, allowing the controller 900 to determine which finger's electrode transmitted the signal. For example, electrode 901 may transmit a signal at time T1, electrode 902 may transmit a signal at time T2, and so on for electrodes 903, 904, and 905, operating at times T3, T4, and T5, respectively. When a TX electrode transmits a signal at a given time, and the RX electrode receives that signal at a specified time, the controller 900 may determine which TX electrode sent the signal and may therefore determine which of the user's fingers touched each other. In some cases, time-multiplexing the transmitted signals may also use less power, thereby prolonging the battery life of the system.

Figure 10B:
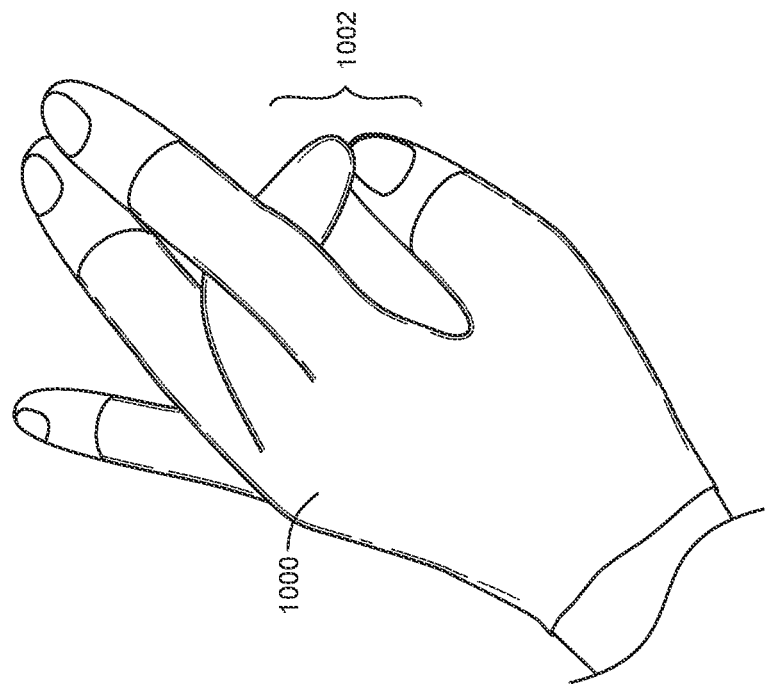
FIGS. 10A-10D illustrate different hand and finger configurations which can be detected according to embodiments of this disclosure.
Figure 10A:
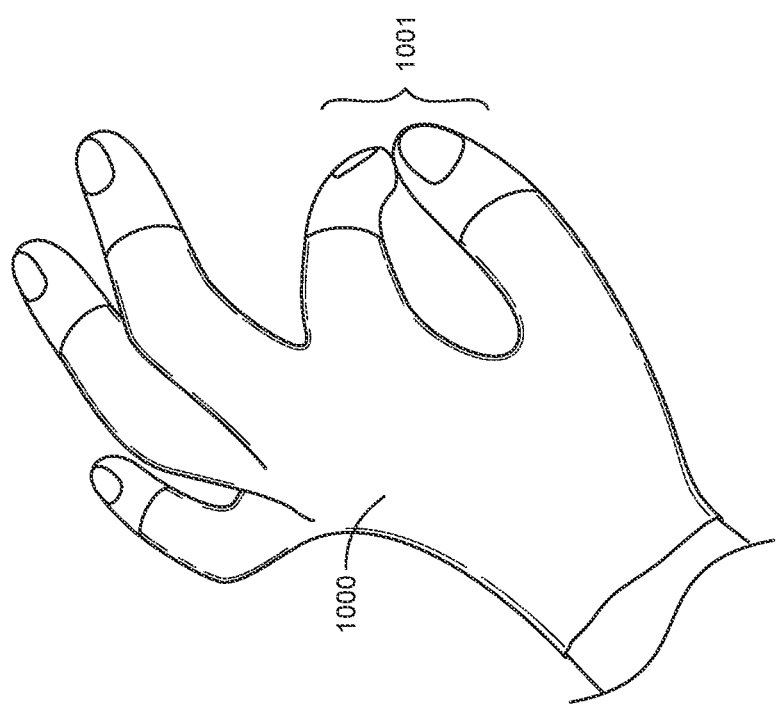
Figure 10D:
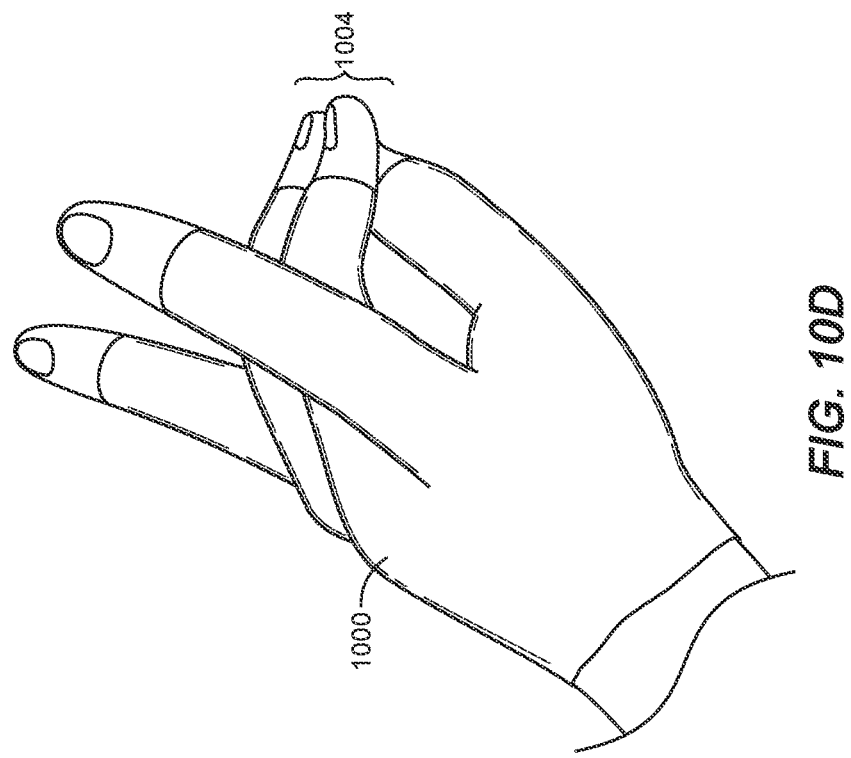
Figure 10C:
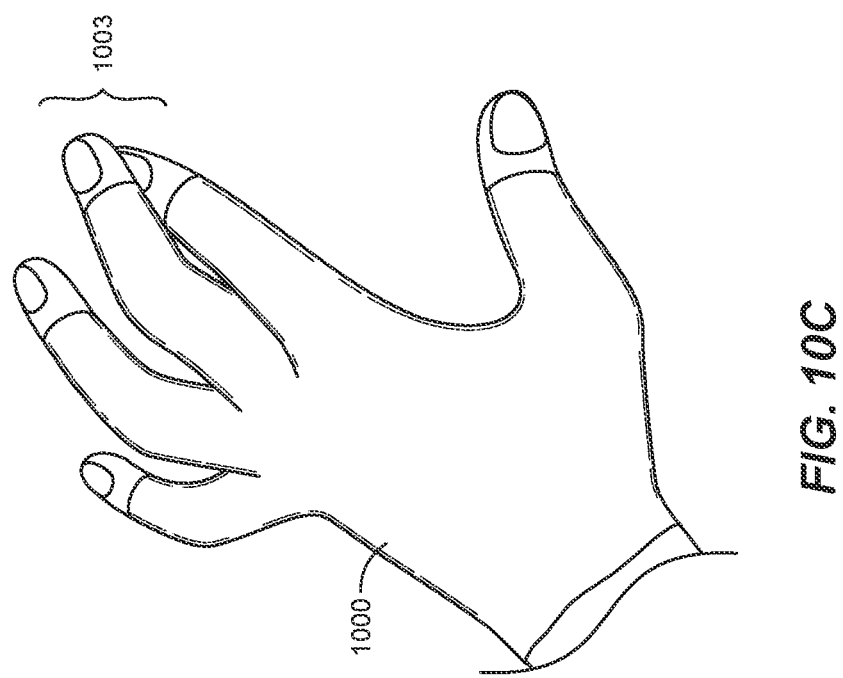

FIGS. 10A-10D illustrate examples in which different finger touches are detected by the controller (e.g., 710 of FIG. 7). The controller may detect, for example, that a user's pointer finger is touching the user's thumb as shown at 1001. In this case, the controller may have detected, at an RX electrode, an electrical signal transmitted by a TX electrode. The RX and TX electrodes may be on either the thumb or the pointer finger in this example. Regardless of which direction the signal travels, the controller may detect the arrival of the signal at the RX electrode and register the value of the signal (e.g., in volts). If the system 1000 is using multiple frequencies, or if time-multiplexing is being used, the controller may be able to determine which fingers are touching. In the example of FIG. 10B, the user's middle finger and thumb are touching, as shown at 1002. In FIG. 10C, the user's middle finger and pointer finger are touching, as shown at 1003, and in FIG. 10D, the user's ring finger, middle finger, and thumb are all touching, as shown at 1004. Accordingly, using different frequencies or different forms of multiplexing, the controller may not only detect multiple fingers touching at the same time but may also determine which fingers are touching.

Figure 11:
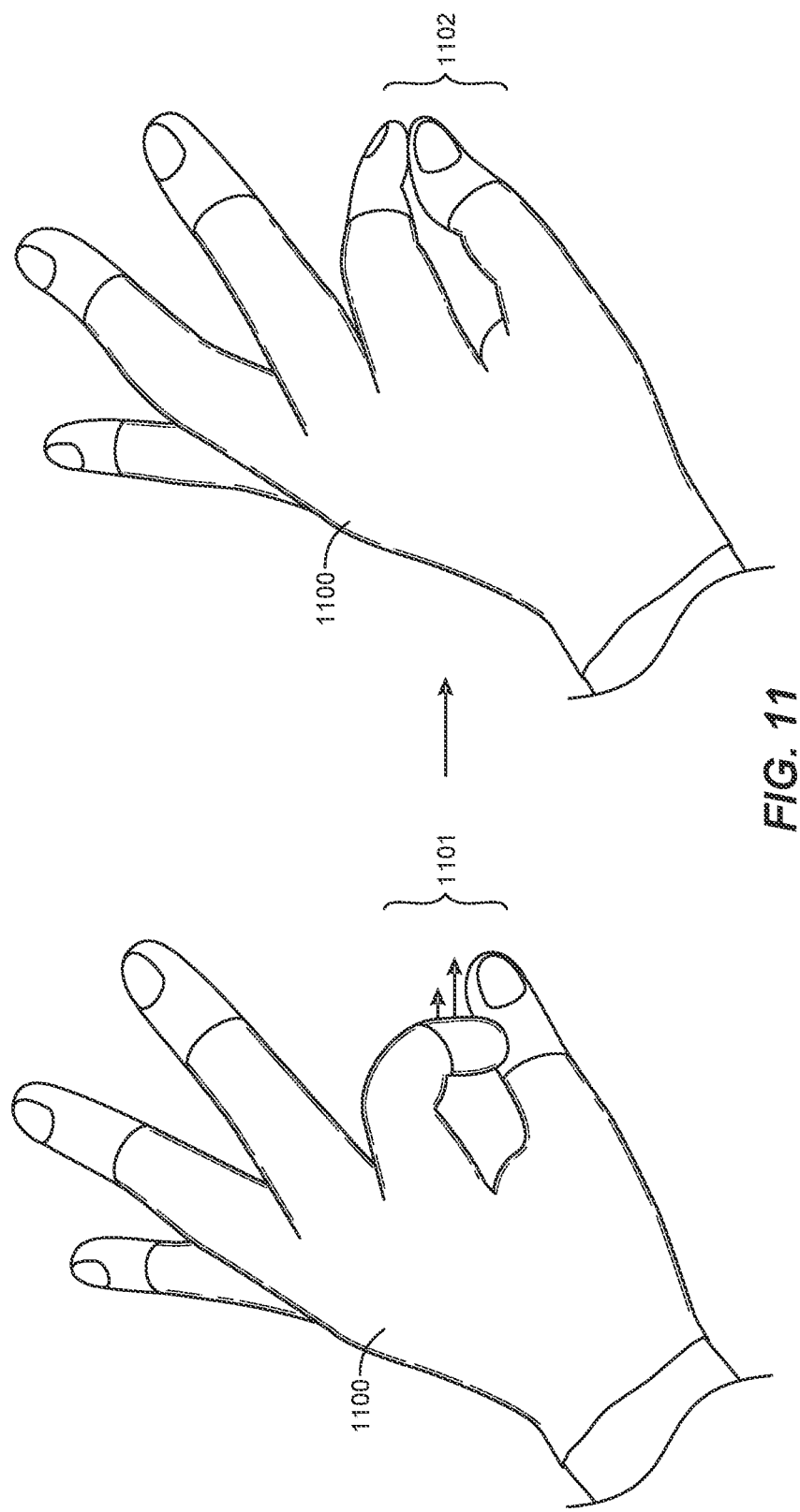
FIG. 11 illustrates an embodiment in which the embodiments of this disclosure are implemented to detect a finger swipe.

In some embodiments, as shown in FIG. 11, the controller (e.g., 710 of FIG. 7) may be configured to detect a specified change in signal indicating a finger swipe. The user may, for example, swipe their pointer finger over their thumb from a starting position at 1101 to an end position at 1102. Alternatively, the user may swipe their thumb on the upper part of index finger or on another finger. The RX electrodes coupled to the glove 1100 may receive changes in signal and pass those to the controller 710. The controller may, for example, identify changes in signal amplitude and may determine that a touch or swipe motion has occurred.

For example, if electrodes on the pointer finger and on the thumb (e.g., 707 and 708 of FIG. 7) are initially opposed, and the user moves their pointer finger to the right, the controller may detect an initial signal amplitude value and, as the user slides their finger away, the controller may detect changing signal values. In some cases, the controller may detect, for example, that a signal amplitude measurement between the TX and RX nodes has ramped up from a relatively low value to a relatively high value. The controller may thus determine that the user's fingers are touching and, based on the timing of when each signal ramps up, may determine the movement direction of the user's fingers. Thus, the embodiments herein may not only determine when a user's fingers have touched or pinched and which fingers those are, they may also determine when a user's fingers have swiped against each other. These swipes may be used as different input mechanisms in a user interface or artificial reality system.

In some cases, each TX electrode may be configured to transmit at a specific frequency. Changes in signal strength with respect to each transmitted frequency may be registered by the controller and compared against a threshold to determine whether a touch occurred. Because, in this example, the TX and RX electrodes may each operate at a different frequency, when the user swipes their finger past their thumb (or other finger), the changes detected in the signals at each frequency may allow the controller to determine which direction the user is moving their fingers. The controller may also be configured to change the operating mode for certain fingers at certain times to detect different movements or different types of touches. For instance, the controller may scan through various transmit or receive modes for each electrode to determine when different fingers are touching. The controller may vary the operative state for each node to determine whether any signals are detectable at a given RX node, for example, and may vary the TX nodes to see if the detect signal at a given finger is from a different finger. The controller may cycle through TX and RX states for each finger, transmit signals from certain fingers and then see which signals are detected at other fingers. Depending on which signals are detected, the controller may identify which signal was transmitted from which finger and identify at which finger that signal was detected. Then, from this information, the controller may determine which fingers are currently touching. In some cases, these cycles between operating states may occur rapidly (e.g., at the millisecond or microsecond level).

In some embodiments, a controller, a battery, various conductors, and other electronic components may be mounted on or embedded in the back of the glove (e.g., glove 700) or elsewhere on the glove. Data processed at the controller may be transmitted wirelessly to an artificial reality headset or to another computing system (e.g., a cloud computing system) or other electronic device. Thus, the glove and/or the controller may include radios such as Bluetooth radios, WiFi radios, cellular radios, global positioning system (GPS) radios, or other types of radios to wirelessly transmit the data to a local or remote data store (e.g., the cloud). In some cases, the glove 700 may also include an accelerometer (e.g., 713) communicatively coupled to the controller 710. The accelerometer may be configured to detect movement of the glove and thus movement of the user's hand. The accelerometer 713 may be used, for example, to track the position of the glove relative to the user's body or relative to a specified point in space. The accelerometer 713 may be used in conjunction with other artificial reality gear, such as that identified in FIGS. 1-6.

A corresponding apparatus may include a support structure dimensioned for a user's hand, one or more transmitting electrodes coupled to a first finger portion of the support structure, one or more receiving electrodes coupled to a second, different finger portion of the support structure, and a controller coupled to the support structure and communicatively connected to the transmitting and receiving electrodes, the controller being configured to: cause the one or more transmitting electrodes to transmit a signal, detect at least a portion of the transmitted signal at at least one of the receiving electrodes and, based on the detected signal, determine that at least two fingers of the user's hand are touching each other.

Thus, the embodiments described herein may determine when a user's fingers are touching and may further determine which of the user's fingers are touching and for how long. Moreover, in embodiments where the electrodes are embedded in gloves or in some other support structure, the controller may determine when the user's fingers are moving relative to each other. This may allow the controller to identify gestures or other touch-based methods of interacting with an electronic device such as a smartphone or artificial reality device.

EXAMPLE EMBODIMENTS

Example 1: A system comprising: a support structure dimensioned for a user's hand; one or more transmitting electrodes coupled to a first finger portion of the support structure; one or more receiving electrodes coupled to a second, different finger portion of the support structure; and a controller that is coupled to the support structure and that is communicatively connected to the transmitting and receiving electrodes, the controller being configured to cause the transmitting electrodes to transmit a signal, detect at least some of the transmitted signal at the receiving electrodes and, based on the detected signal, determine that at least two fingers of the user's hand are touching each other.

Example 2: The system of Example 1, wherein the support structure comprises at least a partial glove.

Example 3: The system of any of Examples 1 and 2, wherein the one or more transmitting electrodes are attached to a finger of the at least partial glove.

Example 4: The system of any of Examples 1-3, wherein the one or more receiving electrodes are attached to a thumb of the at least partial glove.

Example 5: The system of any of Examples 1-4, wherein each finger of the at least partial glove includes one or more transmitting electrodes and wherein the thumb of the at least partial glove includes one or more receiving electrodes.

Example 6: The system of any of Examples 1-5, wherein each of the transmitting electrodes is transmitting at a different frequency.

Example 7: The system of any of Examples 1-6, wherein each of the transmitting electrodes is transmitting a time-multiplexed signal using a shared frequency.

Example 8: The system of any of Examples 1-7, further comprising determining which of the user's fingers are touching the user's thumb.

Example 9: The system of any of Examples 1-8, wherein the first finger portion of the support structure includes at least two transmitting electrodes, the at least two electrodes being separated by a specified distance.

Example 10: The system of any of Examples 1-9, wherein the one or more transmitting electrodes comprise ring electrodes.

Example 11: A computer-implemented method for detecting finger pinching may include, at a controller coupled to a support structure that is dimensioned for a user's hand, the controller being communicatively connected to one or more transmitting electrodes and to one or more receiving electrodes, causing the one or more transmitting electrodes to transmit a signal; detecting at least a portion of the transmitted signal at at least one of the receiving electrodes; and based on the detected signal, determining that at least two fingers of the user's hand are touching each other.

Example 12: The computer-implemented method of Example 11, wherein signals between the transmitting electrodes and the receiving electrodes are multiplexed.

Example 13: The computer-implemented method of any of Examples 11 and 12, wherein the controller detects a plurality of fingers touching at the same time.

Example 14: The computer-implemented method of any of Examples 11-13, wherein the controller detects a specified change in signal indicating a finger swipe.

Example 15: The computer-implemented method of any of Examples 11-14, wherein the support structure further includes an accelerometer communicatively coupled to the controller, and wherein the accelerometer detects movement of the support structure.

Example 16: The computer-implemented method of any of Examples 11-15, wherein the accelerometer tracks the position of the support structure relative to a specified point in space.

Example 17: The computer-implemented method of any of Examples 11-16, wherein the transmitted signal is detected differentially using at least two receiving electrodes.

Example 18: The computer-implemented method of any of Examples 11-17, wherein at least one of the transmitting electrodes or the receiving electrodes is configured switch modes between acting as a transmitting electrode and acting as a receiving electrode.

Example 19: The computer-implemented method of any of Examples 11-18, further comprising scanning through one or more transmit or receive modes for each electrode to determine when the at least two fingers are touching.

Example 20: An apparatus comprising: a support structure dimensioned for a user's hand; one or more transmitting electrodes coupled to a first finger portion of the support structure; one or more receiving electrodes coupled to a second, different finger portion of the support structure; and a controller coupled to the support structure and communicatively connected to the transmitting and receiving electrodes, the controller being configured to: cause the one or more transmitting electrodes to transmit a signal; detect at least a portion of the transmitted signal at at least one of the receiving electrodes; and based on the detected signal, determine that at least two fingers of the user's hand are touching each other.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive signals to be transformed, transform the signals, output a result of the transformation to detect finger pinching, use the result of the transformation to indicate that fingers have touched, and store the result of the transformation to in a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. An electronic device comprising:
a body that includes a display and one or more sensors;
one or more electrodes coupled to the body, at least two of the electrodes being positioned on different fingers of a user's hand; and
a controller in communication with the body and the one or more electrodes, the controller being configured to:
cause at least one of the one or more electrodes to transmit a signal, each electrode being driven at an assigned frequency;
detect a frequency of the transmitted signal received at at least one of the one or more electrodes;
based on the frequency of the detected signal, determine which fingers of the user's hand are currently touching each other according to the detected frequency of the transmitted signal received at the electrodes on at least two of the user's fingers; and
generate a representation of at least those fingers that are determined to be touching for presentation to the user.

2. The electronic device of claim 1, further comprising presenting the generated representation to the user in the display.

3. The electronic device of claim 1, wherein the display in which the generated representation is presented comprises a virtual reality display.

4. The electronic device of claim 1, wherein the display in which the generated representation is presented comprises an augmented reality display.

5. The electronic device of claim 1, wherein the generated representation is dynamically updated as different frequencies of the transmitted signal are detected by the controller.

6. The electronic device of claim 1, wherein the body comprises at least a portion of a haptic glove.

7. The electronic device of claim 6, further comprising providing haptic feedback via the haptic glove indicating which of the user's fingers are touching.

8. The electronic device of claim 1, wherein a plurality of the electrodes that are configured to transmit a signal are driven at different assigned frequencies.

9. The electronic device of claim 8, wherein one or more movements of the electrodes relative to each other are identified using the frequency assigned to each electrode.

10. The electronic device of claim 9, wherein one or more changes detected in the signals at each frequency allow the controller to determine which direction the electrodes are moving relative to each other.

11. An apparatus comprising:
a body that includes a display and one or more sensors;
one or more electrodes coupled to the body, at least two of the electrodes being positioned on different fingers of a user's hand; and
a controller in communication with the body and the one or more electrodes, the controller being configured to:
cause at least one of the one or more electrodes to transmit a signal, each electrode being driven at an assigned frequency;
detect a frequency of the transmitted signal received at at least one of the one or more electrodes;
based on the frequency of the detected signal, determine which fingers of the user's hand are currently touching each other according to the detected frequency of the transmitted signal received at the electrodes on at least two of the user's fingers; and
generate a representation of at least those fingers that are determined to be touching for presentation to the user.

12. The apparatus of claim 11, wherein an amount of signal detected at the at least one electrode coupled to a finger portion of the body surpasses a specified minimum threshold amount.

13. The apparatus of claim 12, wherein detecting an amount of the transmitted signal at at least one of the electrodes coupled to the finger portion includes detecting an initial signal amplitude value and, as the electrodes move relative to each other, detecting a change in signal amplitude value from the initial value to a new value.

14. The apparatus of claim 13, wherein the detected change in signal amplitude value from the initial value to the new value comprises a ramping up or a ramping down in signal amplitude value.

15. The apparatus of claim 14, further comprising determining a timing related to the signal amplitude ramping up or down from the initial value to the new value.

16. The apparatus of claim 15, wherein, based on the determined timing related to the signal amplitude ramping up or down from the initial value to a new value, the controller identifies a specific gesture.

17. The apparatus of claim 11, wherein the controller cycles through transmit and receive states for the electrodes coupled to a first finger portion of the body and for the electrodes coupled to a second finger portion of the body to determine which transmitted signals are detected at each electrode.

18. The apparatus of claim 17, wherein determining which transmitted signals are detected at each electrode includes determining which electrodes transmitted the signals to identify which of the user's fingers are touching.

19. The apparatus of claim 11, wherein the body comprises at least a partial glove dimensioned to at least partially cover a user's hand, wherein each finger of the at least partial glove includes one or more transmitting electrodes, and wherein a thumb of the at least partial glove includes one or more receiving electrodes.

20. A computer-implemented method comprising:
at a controller coupled to a body that is dimensioned for a user's hand, the controller being communicatively connected to a plurality of electrodes and a display, at least two of the electrodes being positioned on different fingers of a user's hand, causing at least one of one or more electrodes to transmit a signal, each electrode being driven at an assigned frequency;
at the controller, detecting a frequency of the transmitted signal received at at least one of the one or more electrodes;
at the controller, based on the frequency of the detected signal, determining which fingers of the user's hand are currently touching each other according to the detected frequency of the transmitted signal received at the electrodes on at least two of the user's fingers; and
at the controller, generating a representation of at least those fingers that are determined to be touching for presentation to the user.

* * * * *